United States Patent [19]

Jones et al.

[11] Patent Number: 5,478,589
[45] Date of Patent: Dec. 26, 1995

[54] STABLE GUM SYSTEM FOR VERY LOW CALORIE TABLE SYRUP APPLICATIONS

[75] Inventors: Lynne J. Jones, Lake Zurich; William F. Racicot, Hawthorn Woods, both of Ill.

[73] Assignee: The Quaker Oats Company, Chicago, Ill.

[21] Appl. No.: 134,249

[22] Filed: Oct. 8, 1993

[51] Int. Cl.⁶ .................................................. A23L 1/09
[52] U.S. Cl. ............................ 426/573; 426/658; 426/654
[58] Field of Search .................................. 426/658, 613, 426/573, 575, 654

[56] References Cited

U.S. PATENT DOCUMENTS

| | | | |
|---|---|---|---|
| 2,876,107 | 3/1959 | Jucaitis et al. | 99/141 |
| 3,007,879 | 11/1961 | Jordan | 252/352 |
| 3,362,833 | 1/1968 | Smith | 99/142 |
| 3,897,262 | 7/1975 | Carlson | 127/55 |
| 4,321,279 | 3/1982 | Schopf et al. | 426/106 |
| 4,394,399 | 7/1983 | Keyser et al. | 426/658 |
| 4,434,186 | 2/1984 | Desia et al. | 426/565 |
| 4,443,482 | 4/1984 | Schopf et al. | 426/106 |
| 4,528,205 | 7/1985 | Turrisi | 426/613 |
| 4,786,521 | 11/1988 | Bennett et al. | 426/658 |
| 4,826,656 | 5/1989 | Huber et al. | 426/565 |
| 5,106,646 | 4/1992 | Swallow et al. | 426/658 |
| 5,194,288 | 3/1993 | Peterson | 426/658 |
| 5,292,545 | 3/1994 | Jones et al. | 426/575 |

*Primary Examiner*—Jeanette Hunter

[57] ABSTRACT

The present invention relates to a gum system for use in a very low calorie table syrup having an aftertaste, said gum system comprising carboxymethylcellulose gum, xanthan gum, and propylene glycol alginate gum, wherein the carboxymethylcellulose gum and xanthan gum are present in a combined amount sufficient to impart to the syrup a desired stable viscosity suitable for a table syrup, and wherein the propylene glycol alginate gum is present in an amount sufficient to substantially mask the aftertaste of the very low calorie table syrup. The present invention also relates to an artificially sweetened, very low calorie table syrup having an aftertaste.

11 Claims, No Drawings

STABLE GUM SYSTEM FOR VERY LOW CALORIE TABLE SYRUP APPLICATIONS

BACKGROUND OF THE INVENTION

1. Field of the Invention

This invention relates to a gum system for use in very low calorie table syrup applications, as well as very low calorie table syrups containing such a gum system.

2. Description of Related Art

In recent years there have been developed a number of synthetic table syrup products. For purposes of the present invention, the term "synthetic table syrup" is meant to describe a table syrup product manufactured to be comparable to naturally occurring syrups, e.g., maple syrup. Among the qualities to which synthetic table syrups are intended to be comparable are taste, mouthfeel, pourability, and stability. In addition, many consumers prefer synthetic table syrups which are thicker, or more viscous, than naturally occurring syrups.

Synthetic table syrups often include a gum system and a large percentage of sugar solids. The gum system is included so that the synthetic syrup mimics the natural syrups in appearance, viscosity, pourability, and mouthfeel, and has the desired thickness, or viscosity, as already discussed. Typically, the gum system includes a suspending, dispersing, or colloidal agent in water. Synthetic and naturally occurring gums are often used in the manufacture of gum systems. Edible preservatives and antimicrobials are often added to the gum system to ensure microbial stability.

A significant percentage of a synthetic table syrup is suspended sugar solids. These sugar solids account to a considerable extent for qualities such as taste, mouthfeel, viscosity, pourability and stability. However, the high sugar solids content of these syrups makes them high in calories, and accordingly, they do not satisfy consumer demand for lower calorie food stuffs.

Attempts to produce a reduced calorie synthetic table syrup which has the desired taste, mouthfeel, viscosity, pourability and stability as discussed herein have been reported in the patent literature. U.S. Pat. No. 4,786,521, issued to Bennett et al., describes a synthetic table syrup including by weight from about 15 to about 45% sugar solids, and up to 50% maltodextrin. The syrup further includes a gum system consisting of carboxymethylcellulose gum and propylene glycol alginate. Bennett et al. attributes the characteristics of the syrup to the critical relationship between the carboxymethylcellulose and the propylene glycol alginate. Specifically, the weight ratio of the carboxymethylcellulose to the propylene glycol alginate must be about 2:1.

U.S. Pat. No. 4,394,399, issued to Keyser et al., describes a reduced calorie synthetic table syrup including by weight about 40% sugar solids, and a gum system consisting of from about 0.5 to about 1.0% carboxymethylcellulose. Keyser et al. teaches that relatively small increases in the amount of carboxymethylcellulose, apparently above 1.0%, dramatically increase viscosity and yield a product having a stringy, slimy, undesirable mouthfeel. Keyser et al. attributes the desirable consistency, mouthfeel, and pourability of their syrup to the interaction between the carboxymethylcellulose and the sugar solids.

U.S. Pat. No. 4,528,205, issued to Turrisi, describes a low calorie syrup including from about 10 to about 43.3% sugar solids by weight of total syrup, in water, from about 0.01 to 1% of alginate ester, from about 0.01 to 1% of clarified xanthan gum, and from about 0.01 to 1% of edible preservative, wherein the ratio of alginate to xanthan gum ranges from 10:1 to about 1:1.

U.S. Pat. No. 5,106,646, issued to Swallow et al., describes a low calorie aqueous table syrup including at least 70% by weight water, sugar solids in an amount of less than 10% by weight, based on the weight of the syrup, an artificial sweetener, and a gum system consisting of carboxymethyl-cellulose and xanthan gum, wherein the xanthan gum is present in an amount of from 15% to 75% by weight of the carboxymethylcellulose.

Some of the above cited patents attribute their desirable characteristics of taste, stability, pourability, mouthfeel and viscosity to the critical interactions between the sugar solids and the gum system. However, a significant percentage of these particular syrups are comprised of sugar solids. Replacing this volume with water and an artificial sweetener would result in an undesirable, watery, dilute product. Furthermore, replacing this volume with water and a gum system would appear, after reviewing the relevant patent literature, to be futile since the patent literature teaches that gums, e.g., carboxymethylcellulose, used in amounts high enough to supply the necessary viscosity for a very low calorie syrup would impair important mouthfeel and pourability characteristics.

Other cited patents attribute their desirable characteristics of taste, stability, pourability, mouthfeel and viscosity to the particular gum systems utilized in a narrowly defined application. There is nothing in these other patents to indicate that these gum systems would provide their desired characteristics outside their narrow application.

It is therefore an object of the present invention to provide a novel and unique gum system for use in preparing very low calorie synthetic table syrups having a desirable viscosity, mouthfeel, pourability, stability, and taste profile. It is also an object of the present invention to provide a pourable food product for use in table syrup applications which contain little or no sugar solids.

It is a further object of the present invention to provide a pourable food product for use in combination with an artificial sweetener in table syrup applications which contain less than about 25 calories per fluid ounce.

SUMMARY OF THE INVENTION

The present invention relates to a gum system for use in a stable, artificial sweetener-containing, very low calorie table syrup having an aftertaste, said gum system comprising carboxymethylcellulose gum, xanthan gum, and propylene glycol alginate gum, wherein the carboxymethylcellulose gum and xanthan gum are present in a combined amount sufficient to impart to the syrup a desired stable viscosity suitable for a table syrup, and wherein the propylene glycol alginate gum is present in an amount sufficient to substantially mask the aftertaste of the syrup.

The present invention also relates to a stable, artificially sweetened, very low calorie table syrup having an aftertaste, said syrup comprising, by weight of the total syrup composition:

a. at least about 70% water;

b. a maximum of about 20% sugar solids;

c. an artificial sweetener; and d. a gum system comprising carboxymethylcellulose gum, xanthan gum, and propylene glycol alginate gum; wherein the artificial sweetener and sugar solids are present in a total amount sufficient to impart to the very low calorie syrup a sweetness level substantially equivalent to that of a table syrup containing between about 30% to about 65% by weight sucrose, wherein the carboxymethylcellulose gum and xanthan gum are present in a combined amount sufficient to impart to the syrup a desired viscosity suitable for a table syrup, and wherein the propylene glycol alginate is present in an amount sufficient to substantially mask the aftertaste of the syrup.

DETAILED DESCRIPTION OF THE INVENTION

The present invention relates to a stable gum system for use in very low calorie table syrup applications, as well as very low calorie table syrups containing the gum system. By "very low calorie table syrup" it is meant a syrup comprising from 0 to about 25 calories, preferably from 0 to about 15 calories, more preferably from 0 to about 10 calories per fluid ounce.

The gum system includes, by weight of the total syrup composition, carboxymethylcellulose gum ("CMC"), xanthan gum, and propylene glycol alginate ("PGA").

"Carboxymethylcellulose" as used herein means a medium or low viscosity carboxymethyl cellulose gum and derivatives thereof, such as soluble metal salts. The most preferred soluble metal salt being the sodium salt, the carboxymethylcellulose gum also preferably has a relatively high degree of carboxymethyl substitution. "Medium or low viscosity carboxymethylcellulose gum" herein means one which exhibits a viscosity of from about 25 to 7000 centipoise ("cps") when added to water at a 2% concentration level and viscosity is determined at 25° C. on a Brookfield Model LVT Viscometer. A "relatively high degree of carboxymethyl substitution" herein means that there are from about 0.70 to about 0.95 carboxymethyl groups per anhydroglucose unit.

Medium or low viscosity carboxymethylcellulose gums, and the soluble metal salts thereof, are well known and are commercially available from the Aqualon Company, located in Hopewell, Va., under the designation 9M31F, 9M8F, and 7LF. A preferred gum is sodium carboxymethylcellulose gum, available under the designation 9M31F from the Aqualon Company. 9M31F has a degree of carboxymethyl substitution of from about 0.85 to about 0.95, and an average viscosity of from about 1900 to about 2450 cps when at a 2% concentration level at 25° C.

The xanthan gum employed is a polysaccharide produced by the bacterium *Xanthomonas campestris*. Xanthan gum consists of mannose, glucose and glucuronic acid as a mixed potassium, sodium and calcium salt. It is preferable to utilize a clarified variety of low-cellulose xanthan gum which has been purified by filtration to remove particulate matter. Clarified xanthan gum provides transparent formulation; non-clarified gum results in a cloudy formulation. The xanthan gum preferably exhibits a viscosity of from about 1200 to about 1600 cps when added to 1 wt. percent KCl water solution at a 1% xanthan gum concentration level, as determined at 25° C. on a Brookfield Model LVT Viscometer. Manthan gums are well known, and are commercially available. Product No. K6B166, from Kelco Gums, San Diego, Calif., is a preferred xanthan gum for purposes of the present invention.

The CMC and xanthan gum act in association with each other to impart a desired viscosity, mouthfeel, stability, and pourability to the gum system. Although the PGA is also capable of increasing the viscosity of very low calorie table syrups, as used herein it is believed to have a negligible impact on the viscosity of the table syrups of the present invention.

The CMC and xanthan gum are present in the gum system and syrup composition of the present invention in a combined amount sufficient to impart to the final syrup product a desired viscosity suitable for a table syrup, preferably in the range of from about 300 cps. to about 1600 cps., more preferably from about 400 cps. to about 1200 cps., still more preferably from about 500 cps. to about 1200 cps., as measured at 20° C. on a Brookfield Model RVT Viscometer. Generally, the CMC is included in an amount of from about 1.00% to about 1.75%, preferably from about 1.00% to about 1.60%, more preferably from about 1.00% to about 1.40% by weight of a total syrup composition. The xanthan gum is typically included at an amount of from about 0.10% to about 0.27%, preferably from about 0.14% to about 0.27%, more preferably from about 0.14% to about 0.22% by weight of a table syrup composition.

Without intending to be bound by theory, it is believed that the interaction between the CMC and the xanthan gum allow for the gum system and table syrup compositions of the present invention to be stable. By "stable" it is meant that the viscosity of the table syrup does not decrease more than 40%, preferably not more than 30%, still more preferably not more than 25%, after 6 months of storage at 20° C.

In both the gum system and table syrup compositions of the present invention, the weight ratio between the CMC and the xanthan gum is preferably maintained in a range of from about 1.5:1 to about 12:1, more preferably from about 5:1 to about 8:1. At these preferred ratios, the gum system and table syrup compositions of the present invention exhibit improved long term viscosity stability under typical storage conditions.

Propylene glycol alginates are presently available in low, medium and high viscosity grades, and all may be used in the present invention. Lower viscosity grade PGA is preferred for the gum system and table syrup compositions of the present invention, preferably exhibiting a viscosity of about 25 cps. when added to an aqueous solution at a 1 wt. % PGA concentration level, as measured in a Brookfield Model LVF Viscometer at 20° C. The use of lower viscosity material is preferred since the functionality of the PGA in the present invention is achieved at low concentrations, and it is preferred that the PGA not contribute significantly to the viscosity of the syrup formulation. Preferred PGA products include Kelcoloid O and Kelcoloid S, both of which are available from Kelco, a division of Merck & Co., Inc., located in Chicago, Ill.

The gum system of the present invention is intended for use in very low calorie table syrups having an aftertaste, and the very low calorie table syrup compositions of the present invention are those which have an aftertaste. By "aftertaste" it is meant a subjectively unpleasant taste sensation which lingers in the mouth following consumption of the very low calorie table syrup. This aftertaste is typically caused by certain artificial sweeteners, CMC, preservatives, the increased flavor levels present in very low calorie table syrups, and/or combinations thereof.

The PGA is included in the gum system and very low calorie table syrup compositions of the present invention in an amount sufficient to substantially, preferably completely, mask this aftertaste. By "mask" it is meant that this undesirable aftertaste is for the most part unnoticeable, although it typically will not be completely hidden. Generally, the PGA is included in an amount of from about 0.01% to about 0.1%, preferably from about 0.02% to about 0.08%, still more preferably from about 0.04% to about 0.06% by weight of the syrup composition.

The weight ratio of the PGA to xanthan gum in the gum system and table syrup compositions of the present invention is preferably maintained in a range of from about 0.1:1 to about 0.5:1, more preferably from about 0.3:1 to about 0.5:1. When the ratio of PGA to xanthan gum becomes too great, the resulting product tends to entrap excess air during processing and acts to mask desirable added flavors.

Since the CMC, xanthan gum and PGA are combined with each other in the gum system and syrup compositions of the present invention, one skilled in the art would appreciate that these components must have little or no impurities which may adversely affect the other components. For example, neither the PGA nor the xanthan gum should contain cellulase in quantities sufficient to degrade the CMC.

It has been quite unexpectedly determined that the particular gum system of the present invention which contains CMC, xanthan gum, and PGA provides a desirous stable vehicle for very low calorie table syrup applications. It has been determined that the gum systems and very low calorie syrup of the present invention have a desirable mouthfeel, stability, viscosity, and pourability. Preparations in accordance with the present invention result in a gum system useful in the manufacturing of palatable very low calorie synthetic table syrups which contain little or no sugar solids.

The present invention also relates to an artificially sweetened, very low calorie table syrup comprising, by weight of the total syrup composition, at least about 70%, preferably at least about 80%, still more preferably at least about 90% water; a maximum of about 20%, preferably about 15%, more preferably about 8% sugar solids; an artificial sweetener; and a gum system as already described herein.

The artificial sweetener used in the present invention can be selected from any known to those skilled in the art. The artificial sweetener preferably provides a minimal amount of calories to a final table syrup composition prepared according to the present invention. Preferred are artificial sweeteners which provide less than about 1 calorie to a final table calorie syrup composition, more preferably 0 calories.

Examples of artificial sweeteners which may be used in the present invention include sucralose, saccharin salts, cyclamates, aspartame, acesulfame K, alitame, and mixtures thereof, with sucralose being preferred.

While individual sweetness preferences vary, it is preferred that the very low calorie table syrup compositions of the present invention have a sweetness level which is equivalent to a table syrup containing from about 25% to about 70%, more preferably from about 30% to about 65%, still more preferably from about 55% to about 65% by weight sucrose. The artificial sweetener is present in an amount sufficient to impart this desired sweetness to the table syrup composition of the present invention, either by itself or in conjunction with other carbohydrate or artificial sweetening agents, depending upon the particular syrup formulation. The amount of sweetener required to achieve this degree of sweetness will depend upon factors such as the type of artificial sweetener or artificial sweetener combination, the total syrup formulation, including types and amounts of flavors and salts, and whether any carbohydrate sweeteners are included in the syrup composition. The following table illustrates the weight percent, of the total syrup formulation, of artificial sweetener necessary for preparing very low calorie table syrups having various desired sweetness levels.

| ARTIFICIAL SWEETENER | WT. % SUCROSE SWEETNESS EQUIVALENT | | | | | |
| --- | --- | --- | --- | --- | --- | --- |
|  | 25 | 30 | 35 | 60 | 65 | 70 |
| Wt % Saccharin | 0.08 | 0.10 | 0.12 | 0.20 | 0.22 | 0.23 |
| Wt % Sucralose | 0.04 | 0.05 | 0.06 | 0.10 | 0.11 | 0.12 |
| Wt % Aspartame | 0.14 | 0.17 | 0.19 | 0.33 | 0.36 | 0.39 |
| Wt % Acesulfame-K | 0.13 | 0.15 | 0.18 | 0.30 | 0.33 | 0.35 |
| Wt % Cyclamate | 0.83 | 1.00 | 1.17 | 2.00 | 2.17 | 2.33 |
| Wt % Alitame | 0.0125 | 0.0150 | 0.0175 | 0.0300 | 0.0325 | 0.0350 |

In using the above table, if one wanted to formulate a very low calorie table syrup containing saccharin and having a sweetness level equivalent to a table syrup containing 65 wt. % sucrose, one would formulate a very low calorie table syrup containing 0.22 wt. % saccharin. Using the same table, a very low calorie table syrup having a sucrose content of 5 wt. % and 0.20 wt. % saccharin would also have a sweetness level equivalent to that of a syrup having a 65 wt. % sucrose content. As another example, a very low calorie table syrup having a sucrose content of 30 wt. % and 0.12 wt. % saccharin would also have a sweetness level equivalent to that of a syrup having a 65 wt. % sucrose content.

Table syrup applications using the gum systems of the present invention are described herein which include no or a minimal amount, i.e., less than 10%, sugar solids. Referring to the table syrup applications which include a minimal amount of sugar solids, sugar solids are included in these applications only to improve the sweetness profile of the table syrups of the present invention. These low concentrations of sugar solids are not included to affect pourability, mouthfeel, stability, and viscosity. It should also be noted that as the calorie content of the syrups of the present invention is decreased, it will be necessary to increase the overall gum concentration to maintain an acceptable syrup viscosity, although the ratio of xanthan gum to CMC will remain the same regardless of the calorie content.

Salt (sodium chloride) may be used with the gum system and table syrup compositions of the present invention to accentuate flavors. An amount of from about 0.10% to about 1.00% by syrup composition weight can be used. However, it should be noted that in applications where the limitation of sodium is necessary, i.e., low sodium foodstuffs, potassium chloride can also be included to accentuate flavors in an amount of from about 0.10% to about 1.00% total syrup composition weight.

Flavoring agents, such as, maple flavor, artificial butter flavor, butterscotch, nut, fruit flavors, sweetness enhancers and caramel, can be used with the gum system and table syrup compositions of the present invention to impart a desired flavor. The flavoring agents are usually included in small amounts, such as, from about 0.01 to about 0.50% by weight of the syrup composition.

Acidulants and buffers may be used with the gum system and table syrup compositions of the present invention to adjust product pH. For example, sodium citrate can be useful in adjusting pH. These ingredients can be included in amounts of from about 0.01% to about 1.00% by weight of the syrup composition. Preferably, if necessary, sufficient concentrations of acidulants and/or buffers are included to maintain the pH of the syrup composition in a range of from about 4 to about 5.

If desired, conventional edible coloring agents may also be utilized with the gum system and table syrup compositions of the present invention to achieve a particular color. The food color can be generally added in small amounts to achieve a desired colored appearance.

Small amounts of anti-mycotic agents or combinations of edible preservatives such as sorbic acid, potassium sorbate, and sodium benzoate may be included in the gum system and table syrup compositions of the present invention to assure microbial stability. Generally, the edible preservatives can be included in an amount of from about 0.01% to about 0.50%, preferably from about 0.01% to about 0.10% by weight of the total syrup composition. More preferably, the edible preservatives include sorbic acid in an amount of from about 0.01% to about 0.10%, and sodium benzoate in an amount from about 0.01% to about 0.10% by weight of the total syrup composition.

Studies have shown that the gas permeability of the container and metal ion content of the ingredients are important to viscosity retention of the gum system over time. The gum system of the present invention, since it includes CMC, is susceptible to breakdown by the presence of oxygen and metal ions, especially divalent cations, such as iron. Using deionized water, where the divalent cations are removed, is one method of improving the viscosity retention over time of the gum system and table syrup compositions of the present invention. "Deionized water" as used herein means water having a reduced ion content, preferably having a specific resistance of at least 200 Kilo-ohms/cm at 20° C., and more preferably at least about 500 Kilo-ohms/cm. The use of a chelating agent such as sodium hexametaphosphate (SHMP) or ethylenediamine tetraacetic acid (EDTA) can also improve viscosity retention. When utilized in the present invention, the chelating agent is typically included in an amount of from about 0.01% to about 0.10% by weight of the table syrup composition. SHMP is the preferred chelating agent for use in the table syrup composition of the present invention. SHMP is preferably included in an amount of from about 0.01% to about 0.10% by weight of the table syrup composition. More preferably, however, the SHMP ingredient is included in an amount of from about 0.025% to about 0.075% by weight of the table syrup composition.

In a preferred embodiment, an artificially sweetened, very low calorie table syrup is prepared comprising, by weight of the total syrup composition:

a. at least 90% deionized water;

b. from 0% to about 8% by weight sugar solids;

c. sufficient artificial sweetener to provide a sweetness level, in combination with said sugar solids, equivalent to a table syrup containing from about 30% to about 65% by weight sucrose;

d. from about 1.00% to about 1.40% carboxymethylcellulose gum;

e. from about 0.14% to about 0.22% xanthan gum;

f. from about 0.03% to about 0.07% propylene glycol alginate gum;

g. from about 0.01% to about 0.10% sodium hexametaphosphate; and h. from about 0.01% to about 0.10% of a preservative selected from the group consisting of sorbic acid, sodium benzoate, and mixtures thereof;

wherein the weight ratio of carboxymethylcellulose gum to xanthan gum is in the range of from about 5:1 to about 8:1 and wherein the weight ratio of propylene glycol alginate gum to xanthan gum is in the range of from about 0.2:1 to about 0.3:1.

The gum system and table syrup compositions of the present invention may be prepared by the process which includes dissolving the CMC, xanthan gum, and PGA components in water. The CMC, xanthan gum and PGA are added in the ratios of CMC to xanthan gum and xanthan gum to PGA as already described herein, and preferably in amounts effective to: (a) provide a syrup having a viscosity in the range of about 250 to about 1000 cps as measured on a Brookfield RVT viscometer at about 20° C.; and (b) substantially mask the aftertaste of the resulting very low calorie table syrup. The CMC, xanthan gum and PGA are typically added in amounts ranging from about 1.00 to about 1.75 weight percent CMC, from about 0.10 to about 0.27 weight percent xanthan gum, and from about 0.01 to about 0.1 weight percent PGA, based on the total syrup composition.

The order and method by which these and other ingredient are added can be very important in producing a desirous product. For example, when a chelating agent is included in the gum system, it is preferably added to the water before any other ingredients. This allows the chelating agent to bind any metal ions in the water before they can react with or degrade any of the other ingredients. Thereafter, the CMC, xanthan gum, and PGA are slowly added to the mixture with agitation. The gums are added at this point in the process so that they can be sufficiently hydrated without competing with other ingredients for the available water. Once the gums are sufficiently hydrated, any other preferred ingredients, such as anti-mycotic agents, edible preservatives, and salt, are added.

Preferably, the temperature of the water is held constant at from about 54°–60° C. The gums preferably are added at this point. The gums are added by means of a high shear mixer or equivalent unit. Salt, edible preservatives, flavorants, coloring agents, artificial sweeteners, and anti-mycotic agents can then be added in almost any order. If a minimal amount of sugar solids (preferably less than 10%) are desired, the sugar solids can be added together with the artificial sweeteners. The entire mixture can thereafter be pasteurized, preferably, at about 88° C. for about one minute. The mixture should then be rapidly cooled to protect the ingredients from heat degradation. The mixture can then be packaged. Preferably, the table syrup composition is packaged in a container which retards or prevents oxygen diffusion into the contained product. Containers which can be used for the syrups of the present invention may be constructed from dense plastics, glass, or metal, with glass being preferred.

The following examples are presented to further describe the present invention and are not meant to limit the present invention unless otherwise stated.

EXAMPLES

Example 1

General Procedure for Producing a Zero Calorie Table Syrup Having a Carboxymethylcellulose/Xanthan Gum/Propylene Glycol Alginate System A gum system according to this invention can be made for a 3,000 gram batch of table syrup using ingredients from the following table in the weight percentages and amounts indicated:

| Ingredient | Percentage | Amount (g) |
| --- | --- | --- |
| Water | 97.11 | 2913.38 |
| Sodium Hexametaphosphate | 0.05 | 1.50 |
| CMC | 1.24 | 37.06 |
| Xanthan Gum | 0.21 | 6.36 |
| PGA | 0.05 | 1.50 |
| Sorbic Acid | 0.10 | 3.00 |
| Salt | 0.44 | 13.26 |
| Sodium Benzoate | 0.09 | 2.70 |
| Flavors/Colors/Artificial | 0.61 | 18.24 |
| Artificial Sweetener | 0.10 | 3.00 |
| Total | 100.00 | 3000.00 |

Weigh out the 2913.38 grams of deionized water and place it into the top insert of a double boiler. Add hot tap water to the bottom of the double boiler and heat the deionized water to about 57°–60° C. Maintain this temperature while adding ingredients. Use a non-aerating stirrer to incorporate ingredients into the heated water. For example, a Glas-Col Model S-25 stirrer (Glas-Col Apparatus Co., Terra Haute, Ind.) can be used together with appropriate equipment to control and monitor stirrer speed. The stirrer is placed on a mixer stand near the double boiler so that the mixer blade is within one-half inch of the bottom of the double boiler insert. The top of the double boiler is covered with aluminum foil to reduce moisture loss. The mixer speed is adjusted to 2300–3500 RPM and 1.50 grams sodium hexametaphosphate (SHMP) is added. The water and SHMP are mixed for about three minutes.

The 37.06 grams CMC, 6.36 grams xanthan gum, and 1.5 grams PGA are weighed out and manually pre-blended before being added to the water. The CMC, xanthan gum, and PGA can be commercially available products, such as CMC 9M31F from The Aqualon Company, Product No. K6B166 from Kelco Gums, and Product Kelcoloid O from Kelco Gums, respectively. The stirrer speed is increased to 4000–4200 RPM and the CMC/xanthan gum/PGA blend is added slowly (it takes about three minutes to add all the blend). After the CMC, xanthan gum, and PGA have been added, any unblended ingredients are scraped off of the double boiler wall and into the mixture using a spatula. The double boiler is covered with foil and the ingredients are mixed for about three minutes. The 13.26 grams salt, 3.00 grams sorbic acid and 2.70 grams sodium benzoate are next added to the mixture. If desired, these ingredients can be weighed out and manually pre-blended before adding them to the mixture. Mix for an additional three minutes at 4000–4500 RPM. The flavors, colors and artificial sweetener are then added, and the mixture is mixed for an additional three minutes at 4000–4500 RPM.

Heat the mixture with continued agitation to 88° C. and hold at that temperature for about one minute without agitation. Quickly remove the mixture from the heat, pour it into conventional syrup bottles (propylene syrup bottles are acceptable), and cap the bottles tightly. Chill the bottles to about 38° C. in a chilled water bath maintained at 4°–18° C. The resulting syrup has a viscosity of 510 cps.

Example 2

A Low Calorie Table Syrup Made with the Gum System which also Contains a Carbohydrate Sweetener A gum system according to this invention can be made and used for a 3,000 gram batch of table syrup which also includes a minor amount of a carbohydrate sweetener by using ingredients from the following table in the weight percentages and amounts indicated:

| Ingredient | Percentage | Amount (g) |
| --- | --- | --- |
| Water | 91.08 | 2732.27 |
| Sodium Hexametaphosphate | 0.05 | 1.50 |
| CMC | 1.22 | 36.48 |
| Xanthan Gum | 0.21 | 6.19 |
| PGA | 0.05 | 1.50 |
| Sorbic Acid | 0.10 | 3.00 |
| Salt | 0.42 | 12.60 |
| Sodium Benzoate | 0.09 | 2.70 |
| Flavors/Colors/Artificial | 0.74 | 22.20 |
| Carbohydrate Sweetener | 6.00 | 180.00 |
| Artificial Sweetener | 0.05 | 1.50 |
| Total | 100.01 | 3000.00 |

Prepare the gum system and table syrup substantially as described in Example 1, but add 180.00 grams carbohydrate sweetener and 1.5 grams artificial sweetener to the mixture following the addition and mixing of the gums and mix for an additional three minutes. The resulting table syrup has a viscosity of 533 cps.

What is claimed is:

1. A gum system for use in a stable, artificial sweetener-containing, very low calorie table syrup having an aftertaste, said gum system comprising by weight of said total syrup composition:
    (a) from about 1.00% to about 1.75% by weight carboxymethylcellulose gum;
    (b) from about 0.10% to about 0.27% by weight xanthan gum; and
    (c) from about 0.01% to about 0.1% by weight propylene glycol alginate gum.

2. A gum system according to claim 1 wherein the weight ratio of carboxymethylcellulose gum to xanthan gum is in the range of from about 5:1 to about 12:1, and wherein the weight ratio of propylene glycol alginate gum to xanthan gum is in the range of from about 0.1:1 to about 0.5:1.

3. A gum system according to claim 1 comprising, by weight of the total syrup composition, from about 1.00% to about 1.40% carboxymethylcellulose gum, from about 0.14% to about 0.22% xanthan gum, and from about 0.03% to about 0.07% propylene glycol alginate gum.

4. A gum system according to claim 3 wherein the weight ratio of carboxymethylcellulose gum to xanthan gum is in the range of from about 5:1 to about 8:1, and wherein the weight ratio of propylene glycol alginate gum to xanthan gum is in the range of from about 0.2:1 to about 0.3:1.

5. A stable, artificially sweetened, very low calorie table syrup, said syrup comprising, by weight of the total syrup composition:

a. at least about 70% water:

b. a maximum of about 20% sugar solids;

c. an artificial sweetener; and d. a gum system comprising carboxymethylcellulose gum, xanthan gum, and propylene glycol alginate gum;

wherein the artificial sweetener and sugar solids are present in a total combined amount sufficient to impart to the very low calorie syrup a sweetness level substantially equivalent to that of a table syrup containing from about 30% to about 65% by weight sucrose, wherein the carboxymethylcellulose gum and xanthan gum are present in a combined amount sufficient to impart to the syrup a desired stable viscosity suitable for a table syrup, and wherein the syrup has a perceived aftertaste absent the presence of the propylene glycol alginate and wherein the propylene glycol alginate is present in an amount sufficient to substantially mask the aftertaste.

6. A syrup according to claim 5 wherein the syrup viscosity is in the range of from about 300 cps to about 1600 cps, as measured at 20° C. on a Brookfield Model RVT Viscometer.

7. A syrup according to claim 6 comprising, by weight of the total syrup composition, from about 1.00% to about 1.75% carboxymethylcellulose gum, from about 0.10% to about 0.27% xanthan gum, and from about 0.01% to about 0.1% propylene glycol alginate gum.

8. A syrup according to claim 7 wherein the weight ratio of carboxymethylcellulose gum to xanthan gum is in the range of from about 5:1 to about 12:1, and wherein the weight ratio of propylene glycol alginate gum to xanthan gum is in the range of from about 0.1:1 to about 0.5:1.

9. A syrup according to claim 8 comprising, by weight of the total syrup composition, at least 90% water.

10. A syrup according to claim 9 comprising, by weight of the total syrup composition, from about 1.00% to about 1.40% carboxymethylcellulose gum, from about 0.14% to about 0.22% xanthan gum, and from about 0.03% to about 0.07% propylene glycol alginate gum, wherein the weight ratio of carboxymethylcellulose gum to xanthan gum is in the range of from about 5:1 to about 8:1, and wherein the weight ratio of propylene glycol alginate gum to xanthan gum is in the range of from about 0.2:1 to about 0.3:1.

11. An artificially sweetened, very low calorie table syrup comprising, by weight of the total syrup composition:

a. at least 90% deionized water;

b. from 0% to about 8% by weight sugar solids;

c. sufficient artificial sweetener to provide a sweetness level, in combination with said sugar solids, equivalent to a table syrup containing from about 30% to about 65% by weight sucrose;

d. from about 1.00% to about 1.40% carboxymethylcellulose gum;

e. from about 0.14% to about 0.22% xanthan gum;

f. from about 0.03% to about 0.07% propylene glycol alginate gum;

g. from about 0.01% to about 0.10% sodium hexametaphosphate; and h. from about 0.01% to about 0.10% of a preservative selected from the group consisting of sorbic acid, sodium benzoate, and mixtures thereof;

wherein the weight ratio of carboxymethylcellulose gum to xanthan gum is in the range of from about 5:1 to about 8:1 and wherein the weight ratio of propylene glycol alginate to gum to xanthan gum is in the range of from about 0.2:1 to about 0.3:1.

* * * * *